July 8, 1952     P. KOLLSMAN     2,602,330

APPARATUS FOR MEASURING WEIGHT FLOW OF FLUIDS

Filed Feb. 28, 1946     3 Sheets-Sheet 1

INVENTOR.
PAUL KOLLSMAN
BY
Albert M. Austin
his ATTORNEY

July 8, 1952 P. KOLLSMAN 2,602,330
APPARATUS FOR MEASURING WEIGHT FLOW OF FLUIDS
Filed Feb. 28, 1946 3 Sheets-Sheet 2
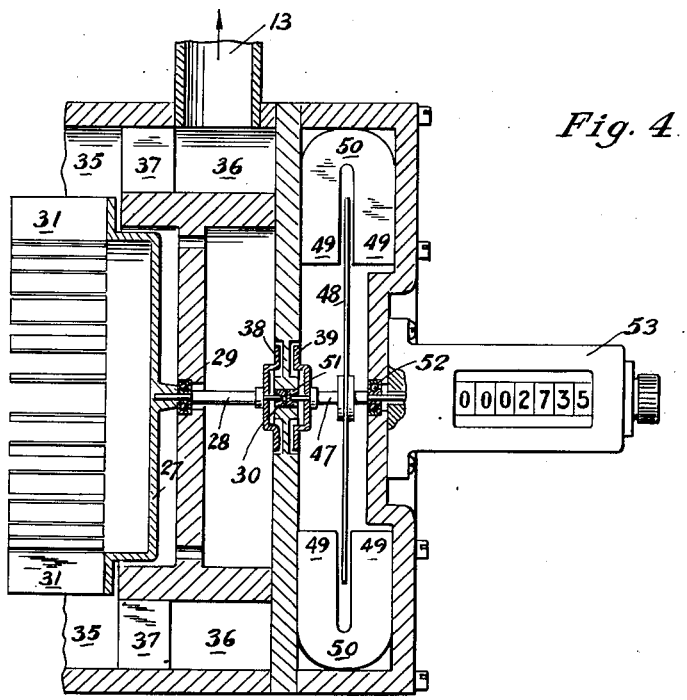
Fig. 4.
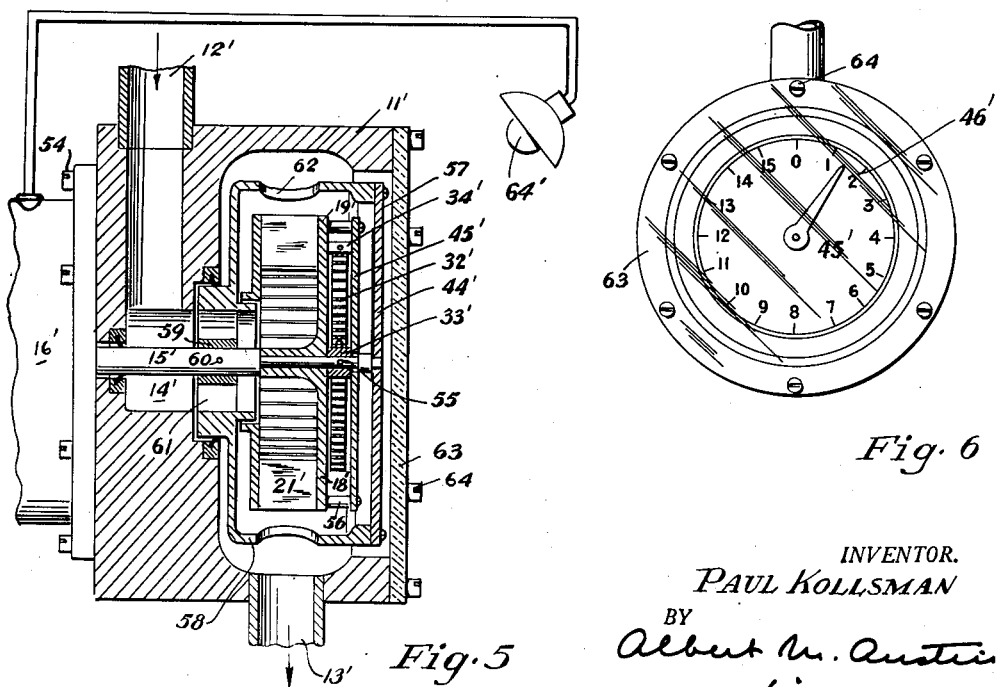
Fig. 5
Fig. 6
INVENTOR.
PAUL KOLLSMAN
BY
Albert M. Austin
his ATTORNEY July 8, 1952          P. KOLLSMAN          2,602,330
APPARATUS FOR MEASURING WEIGHT FLOW OF FLUIDS
Filed Feb. 28, 1946          3 Sheets-Sheet 3
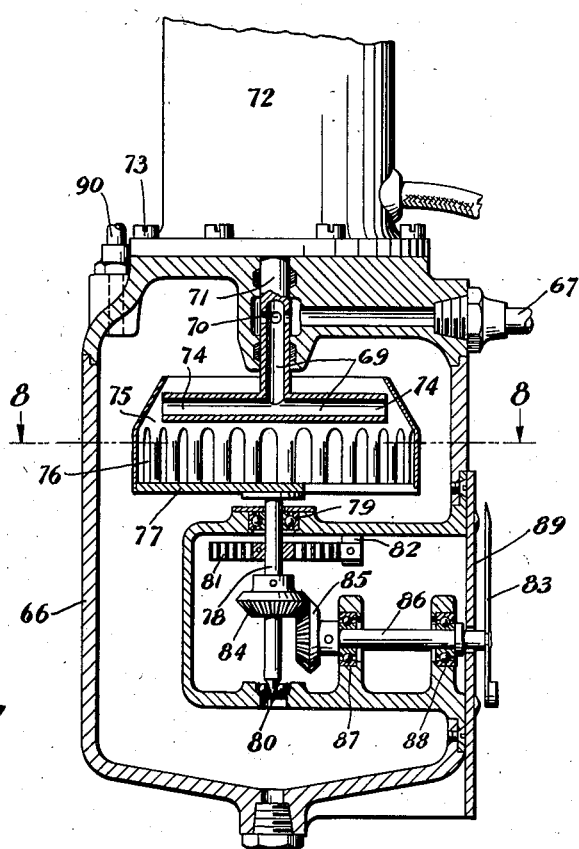
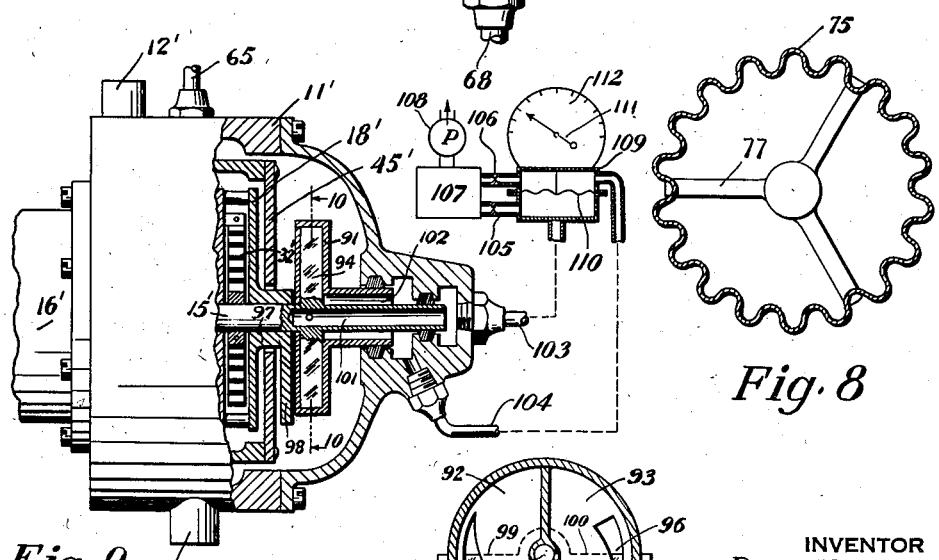
INVENTOR
PAUL KOLLSMAN
BY
Albert M. Austin
his ATTORNEY Patented July 8, 1952

2,602,330

UNITED STATES PATENT OFFICE 2,602,330

APPARATUS FOR MEASURING WEIGHT FLOW OF FLUIDS

Paul Kollsman, New York, N. Y.

Application February 28, 1946, Serial No. 650,844

7 Claims. (Cl. 73—194)

The present invention provides an apparatus for measuring the flow of fluids and provides, more particularly, an apparatus for determining the actual weight flow of a fluid which may be a gas, a liquid, or a mixture of both, the measurement being accurate within a wide range of density and viscosity of the fluid, and uninfluenced by the pressure of the fluid.

The invention further provides an apparatus suited for indicating rate of flow, total flow, and other flow characteristics, and equally suited for regulating purposes, for example, as governing instrument in regulator installations.

The various objects, features and advantages of this invention will appear more fully from the detailed description as follows, accompanied by drawings showing for the purpose of illustration preferred forms of apparatus for practicing the invention.

The invention also consists in certain new and original features of construction and combination of parts, hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it, in which:

Fig. 4 is an enlarged sectional view of a modified apparatus for indicating total flow;

Fig. 5 is an elevational side view, partly in section, of a modified form of flow meter;

Fig. 6 is a front view of the apparatus shown in Fig. 5;

Fig. 7 is an elevational side view partly in section of a modified form of apparatus embodying the invention;

Fig. 8 is a sectional plan view of a rotor of the device of Fig. 7;

Fig. 9 is a sectional side elevation of a device for producing control impulses proportional to the mass flow of a fluid; and Fig. 10 is a detailed view of elements of the apparatus shown in Fig. 9, a section being taken on line 10—10 of Fig. 9.

Figure 1:
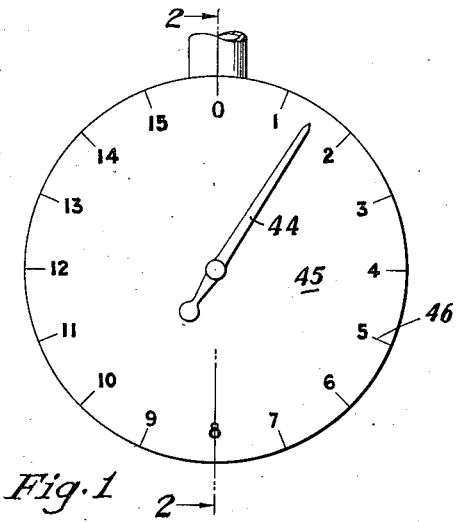
Fig. 1 is a front view of a flow meter, embodying the invention.

In the following description and in the claims, various details will be identified by specific names for convenience. The names, however, are intended to be as generic in their application as the art will permit.

Like reference characters refer to like parts in the several figures of the drawing.

In the drawings accompanying, and forming part of, this specification, certain specific disclosure of the invention is made for the purpose of explanation of broader aspects of the invention, but it is understood that the details may be modified in various respects without departure from the principles of the invention, and that the invention may be applied to other structures than the ones shown.

Figure 3:
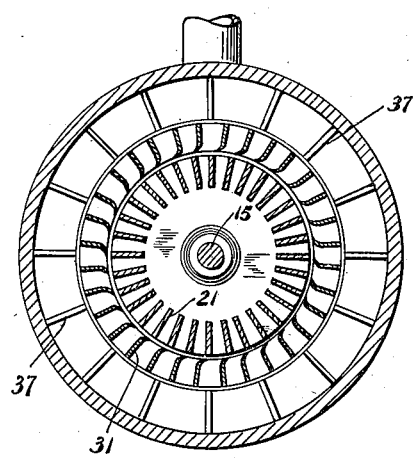
Fig. 3 is a sectional view on a reduced scale of the apparatus shown in Figs. 1 and 2, the section being taken on line 3—3 of Fig. 2.
Figure 2:
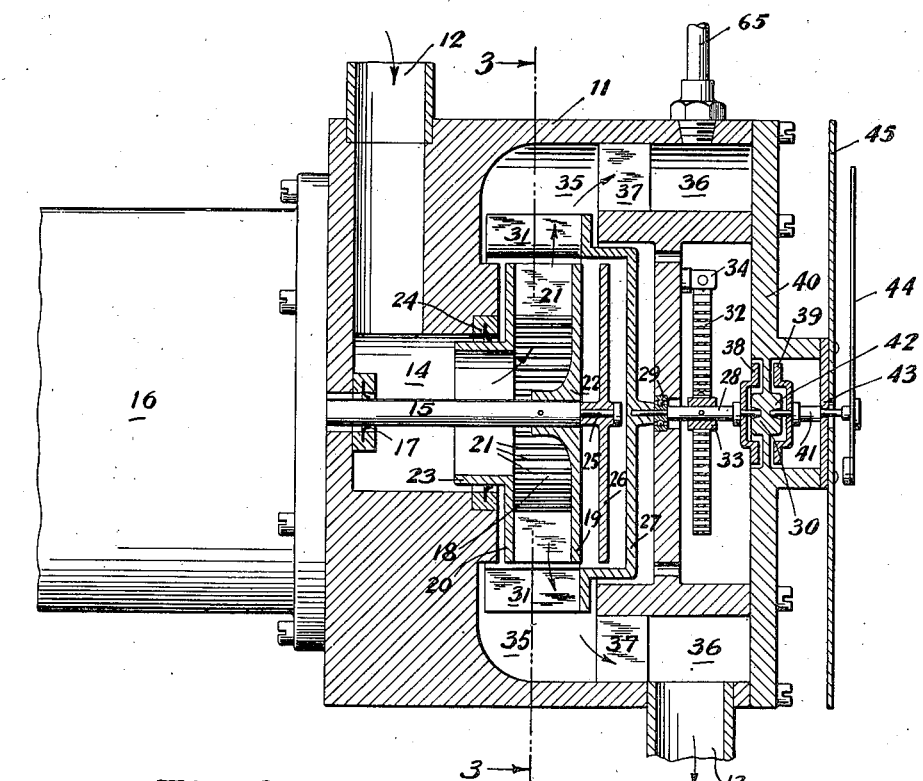
Fig. 2 is an enlarged elevational side view, partly in section, of the apparatus shown in Fig. 1, the section being taken on line 2—2 of Fig. 1.

Referring to the drawings, the flow meter shown in Figs. 1, 2 and 3 comprises a casing or housing 11, having an inlet passage 12 and an outlet passage 13. The inlet passage 12 leads to a central chamber 14, into which the drive shaft 15 of a constant speed motor 16 extends, sealed with respect to the chamber 14 by a suitable gasket 17.

The drive shaft carries near its end an impeller 18. The impeller has two side walls 19 and 20 between which a plurality of substantially radial blades 21 extend. The outer side wall 19 has a hub 22 secured to the drive shaft 15, and the inner side wall 20 has a tubular flange 23 sealed with respect to the central chamber 14 by a gasket 24.

The drive shaft 15 has an extension 25 carrying a disc 26 freely rotatable on the extension.

The impeller 18 is in the nature of the rotor of a centrifugal pump and imparts to the particles of fluid flowing through the meter a rotary motion about the axis of the drive shaft 15. This rotary motion combines, as a tangential component, with a further radial motion or component which the fluid particles have by virtue of the flow of the fluid through the apparatus.

A rotor 27 having a shaft 28 is supported in bearings 29 and 30. The rotor has a plurality of substantially radially extending vanes 31 closely adjacent to the periphery of the impeller 18 and the outer edges of the impeller blades 21. Fluid issuing from the blades 21 of the impeller, impacts upon the vanes 31 of the rotor and exerts a certain force or torque thereon tending to turn the rotor 27 about its axis.

The rotation of the rotor 27 is restricted by a hair spring 32 secured with its inner end to a hub member 33 on the rotor shaft 28 and fastened with its outer end to a boss 34 in the housing of the instrument.

The liquid leaving the vanes 31 of the rotor 27 flows into an inner annular chamber 35, communicating with an outer annular chamber 36 from which the outlet passage 13 extends. A plurality of stationary vanes 37 are arranged between the inner and outer annular chambers, the vanes being radially arranged with respect to the rotor 27 and the impeller 18 to prevent turbulence or swirling of the fluid leaving the instrument.

The rotary position of the rotor 27 is transmitted to the outside of the instrument housing by a magnetic coupling consisting of magnets 38 and 39. Magnet 38 is secured to the end of the rotor shaft 28 and is magnetically coupled with the magnet 39 on the outside of the front wall 40 of the instrument housing. The magnet 39 is secured to the pointer shaft 41 which is rotatable in bearings 42 and 43 and carries a pointer 44 movable over a dial 45. The dial 45 may be graduated in terms of weight flow of fluid, as indicated at 46.

The method practiced by the apparatus is substantially as follows:

The particles of the fluid to be measured are accelerated and are discharged at a predetermined constant velocity. The energy imparted to the fluid is then ascertained. This energy is proportional to the mass flow of the fluid.

The energy imparted to the fluid may be measured directly by determining, for example, the torque required to accelerate the fluid to the predetermined velocity in a rotary impeller and it may also be measured by directing the accelerated fluid against a fluid obstacle and measuring the reaction thereon. In either instance the amount of energy measured is proportional to the mass flow of the fluid and the measuring instrument may be calibrated in terms of mass flow of fluid. This method is applicable to all kinds of pressure fluids, gases, liquids, and mixtures of liquid and gas.

The apparatus illustrated in Figs. 1 to 3 carries out the method and operates substantially as follows:

Fluid is admitted into the apparatus through the inlet passage 12 and enters the interior of the impeller 18 driven by the constant speed motor 16 at a constant rate. The pressure fluid leaving the blades 21 of the impeller 18 has a velocity whose tangential component is equal to the peripheral speed of the impeller. The accelerated fluid particles impact upon the vanes 31 of the rotor 27 and impart their energy to them with the result that the tangential component of the flow is reduced substantially to zero causing the fluid to flow off the vanes of the rotor 27 in a substantially radial direction. The fluid then flows from the inner annular chamber 35 past the stationary vanes 37 and leaves the instrument through the outlet passage 13.

It is evident that the action of the accelerated fluid on the rotor 27 is the stronger the greater the mass of the fluid leaving the impeller blades 21. The action of the fluid on the rotor 27 is measured by determining the torque exerted on the rotor. This is conveniently done by permitting the rotor to be turned about its axis against the action of the hair spring 32 which tends to maintain the rotor in a predetermined zero position. The angular displacement of the rotor 27 is the greater the stronger the impact of the fluid particles on the vanes 31. The angular position of the rotor is transmitted through the liquid-tight wall 40 of the casing and is indicated by the pointer 44 on the dial 45.

In order to minimize the drag exerted by the outer side wall 19 of the impeller on the side wall of the rotor 27, a floating disc 26 is arranged between the two side walls. Liquid particles near the outer side wall 19 of the impeller 18 have a tendency of turning with the impeller at a certain rate which decreases with the distance from the side wall 19. Assuming the floating disc 26 were not present, it is apparent that a certain, although small, drag would be exerted by the outer side wall 19 of the impeller on the rotor 27. This drag is suppressed or reduced to negligible magnitude by the floating disc 26 upon which the torque now acts. The floating disc 26, itself, is braked by the liquid between the disc 26 and the side wall of the rotor 27, which for practical purposes may be considered stationary. As a result, the floating disc 26 turns very slowly and the error torque exerted by it on the side wall of the rotor 27 is negligible.

Liquid friction between the movable parts may be reduced by maintaining the instrument housing partly filled with a gas or air. The impeller 18 causes the liquid entering the instrument from the inlet passage 12 to be broken up into spray. Gas or air under pressure may be admitted into the instrument housing through a duct 65.

The apparatus shown in Figs. 1 to 3 may easily be adapted for indicating the total flow of fluid passing through the instrument within a predetermined period of time. This modification is shown in Fig. 4, showing the front part of the instrument only, it being understood that in all other respects the device corresponds to that shown in Fig. 2. The rotor 27 against whose vanes 31 the accelerated fluid is discharged is freely rotatable in bearings 29 and 30 and is coupled with a second shaft 47 by a pair of coupling magnets 38 and 39. The shaft 47 carries a disc 48 and is freely rotatable between the pole pieces 49 of brake magnets 50, which upon rotation of the disc 48 relatively to the magnets induce eddy currents in the disc, thus applying a braking torque to the shaft 47 and the rotor shaft 28 coupled therewith. The outer shaft 47 rests in bearings 51, 52 and operates a counter 53.

The magnetic brake acting on the rotor 27 is dimensioned to limit the rotation of the rotor 27 to low speeds of the order of approximately one percent of that of the impeller, so that for practical purposes the rotor may be considered stationary. The impact of the accelerated fluid on the rotor then becomes again a measure of the mass flow of fluid passing through the impeller.

The device shown in Fig. 4 operates as follows:

Accelerated fluid acts upon the vanes 31 of the rotor 27 and causes the rotor to turn very slowly under the action of the magnetic brake 49, 50. The rate of rotation of the rotor is proportional to the flow of the fluid passing through the instrument. The greater the mass flow, the greater the rate of rotation of the rotor 27. The number of revolutions of the rotor during a predetermined period of time thus becomes a measure of the mass flow of fluid which passes through the instrument during that period.

Since in the operation of the device, the rotor is not stationary, but is permitted to turn, a certain, although small, error is introduced, due to the fact that the action of the fluid on the rotor depends on the relative speed between impeller and rotor, as well as the mass of the fluid. This small error is compensated by appropriate calibration of the instrument. Assuming for example, that at the greatest flow the rotor turns at one per cent of the rate of the impeller, the resulting error of one per cent is compensated in the calibration so that the instrument reads and records correctly at maximum flow. At reduced flow and lesser speeds of the impeller, a certain error enters the indication which, however, can be neglected, since its effect on the reduced flow of fluid is negligible.

Instead of determining the amount of energy imparted to the fluid particles by measuring the action of the particles on a fluid obstacle, it may also be determined by measuring directly the energy required to accelerate the fluid particles.

Figs. 5 and 6 illustrate an apparatus for measuring directly the energy consumed in accelerating the fluid particles. An instrument casing 11', having inlet and outlet passages 12' and 13', respectively, is secured to a constant speed motor 16' by screws 54. The drive shaft 15' of the motor extends into a central chamber 14' of the casing and carries an impeller wheel 18' having blades 21'. The impeller wheel 18' is freely rotatable on the drive shaft 15' and carries a boss 34' on its side wall 19'. A hair spring 32' extends from the boss 34' to a hub member 33' fast on the drive shaft at 55. The impeller further carries a dial 45' on studs 56, the dial bearing a graduation 46'. A pointer 44' is painted on or secured to a transparent cover plate 57 above the dial 45', the cover plate 57 being secured to an impeller casing 58 surrounding the impeller. The impeller casing 58 has a hub portion 59 secured to the drive shaft at 60. Fluid enters the impeller casing through inlet apertures 61, near the drive shaft and leaves the impeller casing through outlet apertures 62 in the periphery of the casing 58. The dial 45' and pointer 44' are visible through the cover plate 57 and a window 63 secured to the flow meter casing 11 by screws 64.

The operation of the instrument illustrated in Figs. 5 and 6 is as follows:

Fluid entering through the inlet passage 12' flows into the central chamber 14' and into the impeller housing 58 through its axial inlet apertures 61. The fluid then enters the central portion of the impeller wheel 18' and is imparted rotary motion by the blades 21'.

The impeller wheel 18' which is freely rotatable on the drive shaft 15' receives its driving torque from the drive shaft 15' through the hair spring 32'. The hair spring is distorted in proportion to the torque applied to the impeller wheel 18' causing the impeller to change its rotary position on the drive shaft 15'. The distortion of the spring and the rotary position of the impeller is indicated by the pointer 44' which is fixed on the shaft 15' and moves with respect to the dial 45' fixed on the impeller wheel 18'.

Inasmuch as both dial and pointer rotate at the rate of the drive shaft 15', it is necessary to read the instrument in the intermittent light of a gas discharge tube or bulb 64' supplied with electricity from a source of alternating current appropriately tuned with respect to the motor 16'.

The fluid leaves the impeller housing 58 through its peripheral apertures 62 and the instrument casing 11' through the outlet passage 13'.

It is of course not necessary that the fluid obstacle in the path of the accelerated fluid particles assume the form of a rotor with vanes, nor is it necessary that the impeller has the form of a wheel. Figs. 7 and 8 illustrate a modified form of instrument embodying the present invention.

An instrument housing 66 is provided with inlet and outlet ducts 67 and 68 for the fluid whose flow is to be measured. Fluid admitted through the inlet duct 67 enters an impeller 69 through ports 70. The impeller 69 forms an extension of the drive shaft 71 of a motor 72 mounted on the housing 66 by screws 73. The impeller 69 is hollow and comprises a plurality of radially extending discharge ducts 74.

Fluid discharged from the ducts 74 of the rotor impinges upon the inner wall 75 of a rotor and exerts a drag on it. The rotor walls may be smooth or may be corrugated as at 76 to insure that the rotary energy imparted to the fluid is absorbed by the rotor. The rotor wall 75 is supported by a spider 77 on a shaft 78 held in bearings 79 and 80.

Liquid entering the rotor escapes between the arms of the spider 77 and collects at the bottom of the instrument whence it flows off through the outlet duct 68.

The rotation of the rotor 75, 77 is constrained by a spring 81 connected to the rotor shaft 78 and secured with its other end to a boss 82 in the housing 66.

The rotary displacement of the rotor 75, 77 with respect to the housing 66 is transmitted to indicating means over a bevel gear 84 on the rotor shaft 78 meshing with a further bevel gear 85 on a pointer shaft 86 held in bearings 87 and 88. The pointer 83 moves with respect to a dial 89 and indicates the torque exerted on the rotor 75, 77 by the fluid issuing from the impeller 69. The torque is proportional to the mass flow of fluid entering through the inlet duct and if the speed of the motor 72 is constant, the indicator 83, 89 may be calibrated directly in terms of mass flow.

A gas atmosphere may be maintained in the instrument housing 66 at all times, gas being introduced through a gas inlet duct 90.

Devices of the general structure illustrated in Fig. 5 are particularly well suited for remote indication or for control purposes, for example, as mass flow responsive devices in regulators.

Figs. 9 and 10 illustrate an instrument for producing pilot pressures for the actuation of remote indicators or control valves for the control of the flow of fluids. The device has fluid inlet and outlet passages 12' and 13', respectively. Gas or air is admitted into the instrument housing 11' through a gas duct 65. The impeller 18' is driven by the drive shaft 15' of a constant speed motor 16' through a spring 32' which is distorted in proportion to the torque.

The motor shaft 15' carries a hollow casing 91 having two chambers 92 and 93 therein, divided by a wall 94. The chamber 92 communicates with the inside of the housing 11' through a control port 95 and the chamber 93 communicates with the inside of the housing through a control port 96. The control ports may be of any desired shape and extend over an arc which is over twice the amount of largest rotary displacement of the impeller 18' with respect to the drive shaft 15'.

An extension 97 on the impeller 18' carries a shutter 98 having control edges 99 and 100 adapted to cover and uncover the control ports 95 and 96, respectively, to admit unequal amounts of air or gas from the housing into the chambers 92 and 93 depending on the angular position of the impeller 18' with respect to the rotor shaft 15'.

Two concentric ducts 101 and 102 communicate with the chambers 93 and 92, respectively, and lead to pressure impulse lines 103 and 104. The pilot lines 103 and 104 are restricted at 105 and 106, respectively, and lead to a common chamber 107 from which pressure fluid is continuously withdrawn by a pump 108.

For the purpose of illustration of the operation of the device a differential pressure responsive indicator is shown at 109 having a diaphragm 110 acted upon by the pressure in lines 103 and 104. The diaphragm operates a pointer 111 movable over a dial 112 which may be graduated in terms of flow to indicate at a remote point the flow passing through the meter. It is obvious, however, that differential pressure responsive relays may be actuated in place of, or in addition to, the indicator 109 for the purpose of actuating suitable control devices in response to the pilot pressures set up at the flow meter.

In the operation of the device shown in Figs. 9 and 10 the impeller 18' is driven at a substantially constant speed. Fluid is admitted into the instrument through the duct 12'. The impeller 18' assumes an angular position with respect to the drive shaft 15' which is a measure of the mass flow of fluid passing through the instrument. The rotary displacement between the impeller 18' and the drive shaft 15' causes a corresponding displacement between the control shutter 98 and the control ports 95 and 96. When the flow is zero the control shutter 98 covers the ports 95 and 96 to equal degrees. Gas withdrawn through the pilot pressure lines 103 and 104 to a common point of reduced pressure will cause equal pressures to exist in the pressure impulse lines 103 and 104. When a flow of fluid passes through the instrument the impeller 18' changes its rotary position with respect to the drive shaft 15' and causes one of the control ports to be covered to an increasing degree by the control shutter 98 while the other control port is uncovered correspondingly. As a result unequal amounts of gas are withdrawn through the pilot pressure lines 103 and 104 and a differential pressure is set up which may be utilized for actuating control instruments or remote indicators.

Instead of employing a gas for actuating the remote indicating or actuating mechanism, it is of course possible to use the pressure fluid being measured in the instrument by withdrawing a fraction of it through the pilot pressure lines 103 and 104. In this case, the remotely actuated devices are hydraulically rather than pneumatically operated.

The invention thus provides various forms of apparatus for measuring the flow of fluids. The measurements are accurate within wide ranges of viscosity of the fluid, and are independent of pressure and density. The measurement is in terms of actual weight flow as distinguished from volume flow.

Appropriate choice of materials, particularly appropriate choice of the material for the hair spring makes the instrument itself non-responsive to changes in temperature.

The present method and apparatus are admirably suited for the accurate determination of the weight flow of fluids mixed with gas and are particularly well adapted for the control of physical conditions in dependence on the mass flow of a fluid or fluids.

Obviously the present invention is not limited to the particular embodiments and precise combination of steps hereinbefore described and illustrated. For example, it is not necessary to drive the impeller by a constant speed motor. It is sufficient to maintain a constant relation between the speed of the impeller and the constraining force, for example, the force of the spring. If the constraining force is varied in the same ratio as the speed of the impeller, an accurate indication is insured. Thus various changes, modifications, substitutions, additions and omissions may be made without departing from the spirit and teaching of this invention.

What is claimed is:

1. A flow meter comprising, in combination, a centrifugal impeller for accelerating the particles of the fluid to be measured to a predetermined constant velocity; means for confining the entire flow of fluid to be measured to pass through said impeller; a constant speed motor for driving said impeller; a movable obstacle in the path of the accelerated fluid; and force measuring means responsive to the force exerted by said fluid on said obstacle, said force being a measure of the weight flow of fluid.

2. A flow meter comprising, in combination, a casing having an inlet and an outlet port; an impeller in said casing having substantially radially extending blades for accelerating the particles of fluid in said casing; means for sealing the rotary impeller with respect to said inlet port to prevent entry of fluid into said casing except through said impeller; means for driving said impeller at a constant speed; and torque sensitive means displaceable in proportion to the torque exerted by said driving means on said impeller, the displacement being a measure of weight flow of fluid.

3. A flow meter comprising, in combination, a casing having an inlet and an outlet port; a rotary impeller in said casing having substantially radially extending blades; means for sealing the rotary impeller with respect to said inlet port to prevent entry of fluid into said casing except through said impeller; means for driving said impeller at a constant speed; a rotor mounted in said casing for rotation coaxially with said impeller, said rotor having vanes impinged upon by fluid accelerated by said impeller; and torque sensitive means displaceable in proportion to the torque exerted on said rotor by said accelerated fluid, the torque being a measure of weight flow of fluid.

4. A flow meter comprising, in combination, a casing; a rotary impeller in said casing having substantially radially extending blades; a fluid inlet duct leading to the central portion of said impeller; means for sealing the central portion of said impeller with respect to said inlet duct to prevent passage of fluid into said casing from said inlet duct except through said impeller; means for driving said impeller at constant speed; a rotor mounted in said casing for rotation coaxially with said impeller, said rotor having substantially radially extending vanes adjacent the periphery of said impeller, said vanes being in the path of the fluid accelerated by said blades; an outlet passage extending from said rotor; a spring biasing said rotor towards a predetermined position; and indicating means actuated by said rotor, said indicating means being calibrated in terms of weight flow of fluid.

5. A flow meter comprising, in combination, a casing; a rotary impeller in said casing having substantially radially extending blades; a fluid inlet duct leading to the central portion of said impeller; means for sealing the central portion of said impeller with respect to said inlet duct to prevent passage of fluid into said casing from said inlet duct except through said impeller; means for driving said impeller at constant speed; a rotor mounted in said casing for rotation coaxially with said impeller, said rotor having substantially radially extending vanes adjacent the periphery of said impeller, said vanes being in the path of the fluid accelerated by said blades; an outlet passage extending from said rotor; means for applying a braking torque on said rotor; and means for indicating the total number of revolutions of said rotor.

6. A flow meter comprising, in combination, a casing; an impeller in said casing having substantially radially extending fluid accelerating surfaces for centrifugally accelerating fluid passing through said casing; means forming an inlet passage in said casing, said inlet passage leading to the central portion of said impeller; means forming an outlet passage in said casing, said outlet passage leading from the peripheral portion of said impeller; means for sealing said impeller with respect to said inlet passage to prevent passage of fluid from said inlet to said outlet except through said impeller; means for driving said impeller at constant speed; and force measuring means responsive to the energy imparted to the fluid by said impeller, the force being a measure of the weight flow of fluid.

7. A flow meter comprising, in combination, means for accelerating the particles of the fluid to be measured to a predetermined constant velocity; flow conducting means for confining and directing into said accelerating means the entire flow of fluid to be measured for acceleration of all the fluid particles of the flow by said accelerating means; and force measuring means responsive to the force required for such acceleration, said measuring means indicating in terms of weight flow of fluid.

PAUL KOLLSMAN.

REFERENCES CITED

The following references are of record in the file of this patent:

UNITED STATES PATENTS

| Number | Name | Date |
|---|---|---|
| 676,014 | Warring | June 11, 1901 |
| 1,550,124 | Thompson | Aug. 18, 1925 |
| 1,637,927 | Bonn | Aug. 2, 1927 |
| 1,723,661 | Schellens | Aug. 6, 1929 |
| 1,836,995 | Stickney | Dec. 15, 1931 |
| 2,248,030 | Zwack | July 1, 1941 |
| 2,344,331 | Swift et al. | Mar. 14, 1944 |
| 2,360,546 | Cardwell | Oct. 17, 1944 |
| 2,472,609 | Moore | June 7, 1949 |